United States Patent

Saur

[11] Patent Number: 5,979,778
[45] Date of Patent: Nov. 9, 1999

[54] THERMOSTATIC VALVE ARRANGEMENT

[75] Inventor: Roland Saur, Stuttgart, Germany

[73] Assignee: Behr Thermot-Tronik GmbH & Co., Germany

[21] Appl. No.: 09/097,344

[22] Filed: Jun. 15, 1998

[30] Foreign Application Priority Data

Jun. 15, 1997 [DE] Germany ............ 197 25 222

[51] Int. Cl.$^6$ ............................................. F01P 7/16
[52] U.S. Cl. ............................................. 236/34.5
[58] Field of Search .................. 236/34, 34.5; 123/41.1

[56] References Cited

U.S. PATENT DOCUMENTS

| | | | |
|---|---|---|---|
| 4,522,334 | 6/1985 | Saur | 236/34.5 |
| 4,550,693 | 11/1985 | Saur | 123/41.1 |
| 4,674,679 | 6/1987 | Saur | 236/34.5 |
| 5,231,955 | 8/1993 | Saur et al. | 123/41.1 |
| 5,238,185 | 8/1993 | Saur et al. | 236/34.5 |
| 5,419,488 | 5/1995 | Saur et al. | 236/34.5 |
| 5,447,271 | 9/1995 | Kunze et al. | 236/34.5 |
| 5,482,010 | 1/1996 | Lemberger et al. | 123/41.1 |
| 5,494,005 | 2/1996 | Saur | 123/41.1 |
| 5,555,854 | 9/1996 | Huemer et al. | 123/41.1 |
| 5,617,816 | 4/1997 | Saur et al. | 123/41.08 |
| 5,676,308 | 10/1997 | Saur | 236/34.5 |
| 5,706,853 | 1/1998 | Ronnow et al. | 137/505.14 |
| 5,711,258 | 1/1998 | Saur | 123/41.29 |

FOREIGN PATENT DOCUMENTS 195 45 081
A1  6/1997  Germany .

Primary Examiner—William E. Tapolcai
Attorney, Agent, or Firm—Kennedy Covington Lobdell & Hickman, LLP

[57] ABSTRACT

A thermostatic valve arrangement includes a stop element disposed at a fixed location on a shaft that extends from and is fixedly connected to a thermostatic element housing. The stop element is located between the housing and a retaining ring which retains a bypass valve disc slidably mounted on and in direct contact with the shaft, and the bypass valve disc is located between the retaining ring and the stop element. An abutment member is slidably mounted directly on the shaft between the housing and the stop member. A bypass spring urges the bypass valve disc into engagement with the retaining ring and an additional spring urges the abutment member into engagement with the stop element. A shoulder of the bypass valve disc engages the abutment member when it is displaced by a predetermined distance along the shaft toward the housing against the bypass spring. The shoulder extends axially along the shaft at a radial spacing therefrom which is sufficient to permit the stop element to move therein. An axial bore is provided in the end of the shaft and a transverse bore is provided adjacent the stop element that communicates with the transverse bore, whereby a minimal coolant bypass flow is provided when the bypass valve disc is in the closed position, and the shoulder forms a seal with the abutment member and blocks the minimal bypass flow when the bypass valve disc is fully open.

9 Claims, 3 Drawing Sheets

THERMOSTATIC VALVE ARRANGEMENT

FIELD OF THE PRESENT INVENTION

The present invention relates to thermostatic valve arrangements for controlling the temperature of a coolant fluid provided to an internal combustion engine for maintaining the engine at a desired operating temperature and, more particularly, to such a thermostatic valve arrangement which blocks or at least restricts conventional bypass coolant flow when the engine is in a cold state running at idle; permits some extent of bypass coolant flow but blocks radiator coolant flow when the engine is in a cold state running above idle; permits a combined bypass and radiator coolant flow when the engine is not in a cold state; and blocks bypass coolant flow but permits radiator coolant flow when maximum cooling of the engine is required.

BACKGROUND OF THE PRESENT INVENTION

Thermostatic valve arrangements are well known in the art, and a conventional thermostatic valve arrangement is used to adjust the temperature of a fluid coolant provided to an internal combustion engine in order to maintain a desired operating temperature of the engine. In general, each thermostatic valve arrangement includes a main valve assembly for controlling coolant flow from a coolant radiator into a mixing chamber, a bypass valve assembly for controlling coolant flow directly from the engine into the mixing chamber, and a thermostatic assembly for inversely adjusting the main valve assembly and the bypass valve assembly for adjusting the two coolant flows into the mixing chamber.

Conventional operation of such conventional thermostatic valve arrangements is as follows. During initial operation of the engine when the engine is in a cold state, flow through the main valve assembly of the thermostatic valve arrangement is closed and flow through the bypass valve assembly is open whereby coolant flows from the fluid passage for the engine outlet directly to the fluid passage for the engine intake without passing through the coolant radiator. When the temperature of the coolant reaches the "opening" temperature—or "reaction" temperature—of the thermostatic element of the thermostatic assembly, flow from the radiator through the main valve assembly is opened and flow through the bypass valve assembly is reduced. Thus, the thermostatic valve assembly regulates the temperature of the coolant flowing into the engine intake by changing as a function of its position the cross-sectional flow through the main valve assembly and the cross-sectional flow through the bypass valve assembly, whereby relatively cool coolant from the coolant radiator and relatively warm coolant coming from the engine outlet are mixed in the mixing chamber to obtain a desired temperature. Thereafter the mixture having the desired temperature flows to the engine intake. During a maximum cooling operation, flow through the bypass valve assembly is closed and flow through the main valve assembly is completely opened.

Based on the foregoing, it can be seen that such conventional thermostatic valve arrangements have three operating states, i.e., an initial state wherein the bypass valve assembly is open and the main valve assembly is closed, an operating state wherein both valve assemblies are open to varied extents, and a cooling state wherein the bypass valve assembly is closed and the main valve assembly is fully open.

An improvement in such thermostatic valve arrangements is disclosed by DE 195 45 081 A1 wherein the thermostatic valve arrangement therein further blocks fluid flow through the bypass valve assembly during engine warm up when the engine is in a cold state and running at idle. With particular reference to the Figure of this reference, this improvement is accomplished in the bypass valve assembly by use of a bypass spring (31) that urges a bypass valve disc (30) slidably disposed about a shaft (25) toward a retaining ring (28) secured on the end of the shaft and into covering relation with the fluid passage (14) for the engine outlet, which consequently permits the engine to reach a desired operating temperature more quickly than possible with the aforementioned thermostatic valve arrangements. Furthermore, in order to prevent local overheating of the engine when operated above idle rpm in the cold state, the bypass valve assembly functions as an overpressure valve whereby the bypass valve disc and the bypass spring initially yield to a predetermined differential pressure between the fluid passage for the engine outlet and the fluid passage for the engine intake. A cross-sectional flow through the bypass is thus created when the predetermined differential pressure is exceeded due to the higher rpm of the engine when operated above idle rpm in the cold state. When the differential pressure reaches a second, higher predetermined differential pressure, the bypass valve disc engages an abutment member (26). The abutment member includes a sleeve (29) that is slidably disposed about the shaft and extends towards the retaining ring and on which the bypass valve disc actually slides. A spring (27) urges the abutment member into engagement with the retaining ring and, when the bypass valve disc engages the abutment member, the spring assists the bypass spring in resisting further displacement of the bypass valve disc from the retaining member.

The thermostatic valve arrangement of DE 195 45 081 A1 furthermore provides a minimal coolant bypass flow even when the bypass valve assembly is closed by the provision of openings (34) in the bypass valve disc, the total cross-sectional flow through which is less than the maximum cross-sectional flow through the fluid passage for the engine outlet. These openings thereby provide a minimum coolant bypass flow when the bypass valve assembly is closed. Furthermore, the abutment member extends radially outwardly sufficient to sealingly cover the openings when the bypass valve disc is fully open and in engagement with the abutment member. The bypass valve disc also includes a collar (32) which assures that the bypass flow, including the bypass flow through the openings, does not flow directly to the engine intake but, instead, is directed towards the thermostatic element for proper functioning of the thermostatic element.

In comparison with the thermostatic valve arrangement of the present invention, the thermostatic valve arrangement disclosed in DE 195 45 081 A1 includes a thermostatic assembly, a spring support member, a main valve assembly, a bypass valve assembly, and a valve support assembly. Furthermore, the thermostatic valve of DE 195 45 081 A1 has similar operating characteristics to those of the thermostatic valve arrangement of the present invention. However, the thermostatic valve arrangement of the present invention achieves these similar results in an alternative, simplified, and cost effective manner with modifications to the bypass valve assembly and valve support assembly as discussed in detail below.

SUMMARY OF THE PRESENT INVENTION

It is an object of the present invention to shorten the warm-up period of an internal combustion engine by reducing the coolant bypass flow that occurs when the engine is in the cold state and running at idle, but without reducing the otherwise conventional coolant bypass flow that occurs when the engine is not in the cold state. It is a further object of the invention to provide conventional coolant bypass flow when the engine is run at rpm levels above idle while still in the cold state, whereby possible local overheating is prevented. It is yet a further object of the invention to provide at least a minimal coolant bypass flow even when the bypass valve assembly is closed except for when the thermostatic assembly is in a fully expanded condition for maximum cooling.

Briefly, the thermostatic valve of the present invention includes:

a thermostatic assembly including a thermostatic element housing containing a thermostatic element which increases in volume with increases in temperature and which decreases in volume with decreases in temperature, a piston extending from a first end of the housing in a first direction along an axis and movable relative to the housing in response to volume changes in the thermostatic element; and a shaft extending along the axis in a second direction opposite to the first direction from and fixed relative to a second end of the housing;

a spring support member extending from the housing generally perpendicular to the axis and including an opening through which the housing is slidably disposed a main valve assembly including a main valve member disposed axially about the housing for slidable movement relative thereto, the first end of the housing having a radially enlarged portion for preventing the first end of the housing from sliding through the opening in the main valve member; and a main spring element extending between and connected to the main valve member and the spring support member for urging the main valve member away from the spring support member toward engagement with the enlarged portion of the first end of the housing;

a bypass valve assembly including a retaining member secured to the shaft at a fixed location thereon; a bypass valve member disposed axially about the shaft for slidable movement relative thereto and disposed between the retaining member and the housing; and a bypass spring element disposed between and connected to the bypass valve member and the spring support member, the retaining member preventing sliding movement of the bypass valve member therepast and the bypass spring element urging the bypass valve member away from the spring support member toward engagement with the retaining member; and a valve support assembly including a stop element disposed on the shaft at a fixed location thereon between the housing and the retaining member; an abutment member slidably disposed on the shaft between the housing and the stop member;

and a third spring element disposed between and connected to the abutment member and the housing, the stop member preventing sliding movement of the abutment member therepast and the third spring element urging the abutment member away from the housing toward engagement with the stop member.

Preferably, the bypass valve member is slidably disposed in direct contact with the shaft. Furthermore, the bypass valve member preferably includes a sleeve-like shoulder that surrounds the shaft at a radial spacing therefrom and that extends towards the abutment member for engagement therewith when the bypass valve member and the housing move towards one another by a predetermined distance whereby the position of the bypass valve disc is fixed for the usual regulating process of the thermostatic assembly. The radial spacing of the sleeve-like shoulder also preferably is dimensioned to permit the stop element on the shaft to move therein when the housing and the bypass valve member move towards one another.

The aforementioned objects and other objects of the invention are achieved by the above-described thermostatic valve arrangement of the present invention by maintaining the bypass valve disc in contact against the fluid passage for the engine outlet with the bypass spring until a predetermined differential pressure $P_1$ between the engine intake and the engine outlet is reached, after which the bypass spring yields and further pressure displaces the bypass valve disc from the fluid passage opening. When the bypass valve has been displaced a predetermined distance resulting from a differential pressure $P_2$, it engages the abutment member which is biased against further displacement of the bypass valve disc by the third spring member. Furthermore, the third spring member is preferably sufficiently pre-stressed and has a sufficient spring characteristic to prevent any further displacement of the bypass valve disc from the fluid passage even against the maximum possible pressure which may occur between the engine intake and the engine outlet during normal operating conditions.

With such a thermostatic valve arrangement, the bypass valve disc closes the fluid passage for the engine outlet as long as the predetermined pressure $P_1$ is not surpassed. The differential pressure P is directly dependent on the engine rpm, so that it is possible to correlate states of the thermostatic valve arrangement in which the bypass disc rests on the fluid passage for the engine outlet in relation to the engine rpm. Thus, for example, the bypass spring can be designed to yield when engine rpm is approximately 1,000/min, or slightly greater than idle rpm, whichever is higher, and maximally yield when the engine rpm is approximately 2,000/min, after which the bypass valve disc will rest against the abutment member supported by the third spring. Then, in operation of the thermostatic valve arrangement, if the internal combustion engine runs in idle in a cold state at relative low rpm, i.e., at differential pressures less than $P_1$, the warm-up period of the engine is considerably shortened since no bypass coolant flow occurs. However, if the engine is run at other than idle in the colds state, i.e., at a differential pressure greater than $P_1$, then some extent of a coolant bypass flow is provided to prevent any localized overheating of the engine and, moreover, a maximum bypass flow is provided if the engine runs in the cold state such that the differential pressure exceeds $P_2$.

Furthermore, as a general rule the internal combustion engine will be operated at rpm which generates a differential pressure greater than $P_2$ when the engine has reached the desired operating temperature, whereby the bypass valve disc will rest in engagement with the abutment member and the thermostatic valve arrangement will adjust the coolant flow from the radiator into the mixing chamber and the coolant flow from the bypass into the mixing chamber as conventionally known and discussed above without restriction of the conventional bypass flow by the bypass valve disc which otherwise occurs in the present invention when the engine is in the cold state and running at idle or slightly thereabove.

In furtherance of the object of the present invention of providing a minimum bypass coolant flow even when the engine is in the cold state and is run at idle, openings can be provided in the bypass valve disc. However, it is preferred that the shaft be formed with a longitudinal bore starting at its end facing the fluid passage for the engine outlet and extending toward the thermostatic element housing, and with which a transverse bore formed in the shaft in front of the abutment member communicates. A defined, small bypass flow will thereby be provided even when the bypass valve disc is in the closed position. It is furthermore preferred that the sleeve-like shoulder of the bypass valve disc and the abutment member form a seal which blocks the transverse bore for blocking the minimum bypass flow into the mixing chamber when the bypass valve disc is in the fully open position, as desired by yet a further object of the invention. Furthermore, any bypass coolant flow is completely blocked when, in the course of normal operation of the thermostatic assembly, the bypass valve disc while in engagement with the abutment member is advanced to the fluid opening for the engine outlet by the expansion of the thermostatic operating element, so that even the relatively small amount of coolant which otherwise could flow through the shaft does not hamper the required maximum cooling of the engine required at that time.

BRIEF DESCRIPTION OF THE DRAWINGS

Further objects, benefits, and features of the present invention will become apparent with reference to the following detailed description of the preferred embodiments of the present invention including the drawings, wherein.

DETAILED DESCRIPTION OF THE PREFERRED EMBODIMENTS

Figure 1:
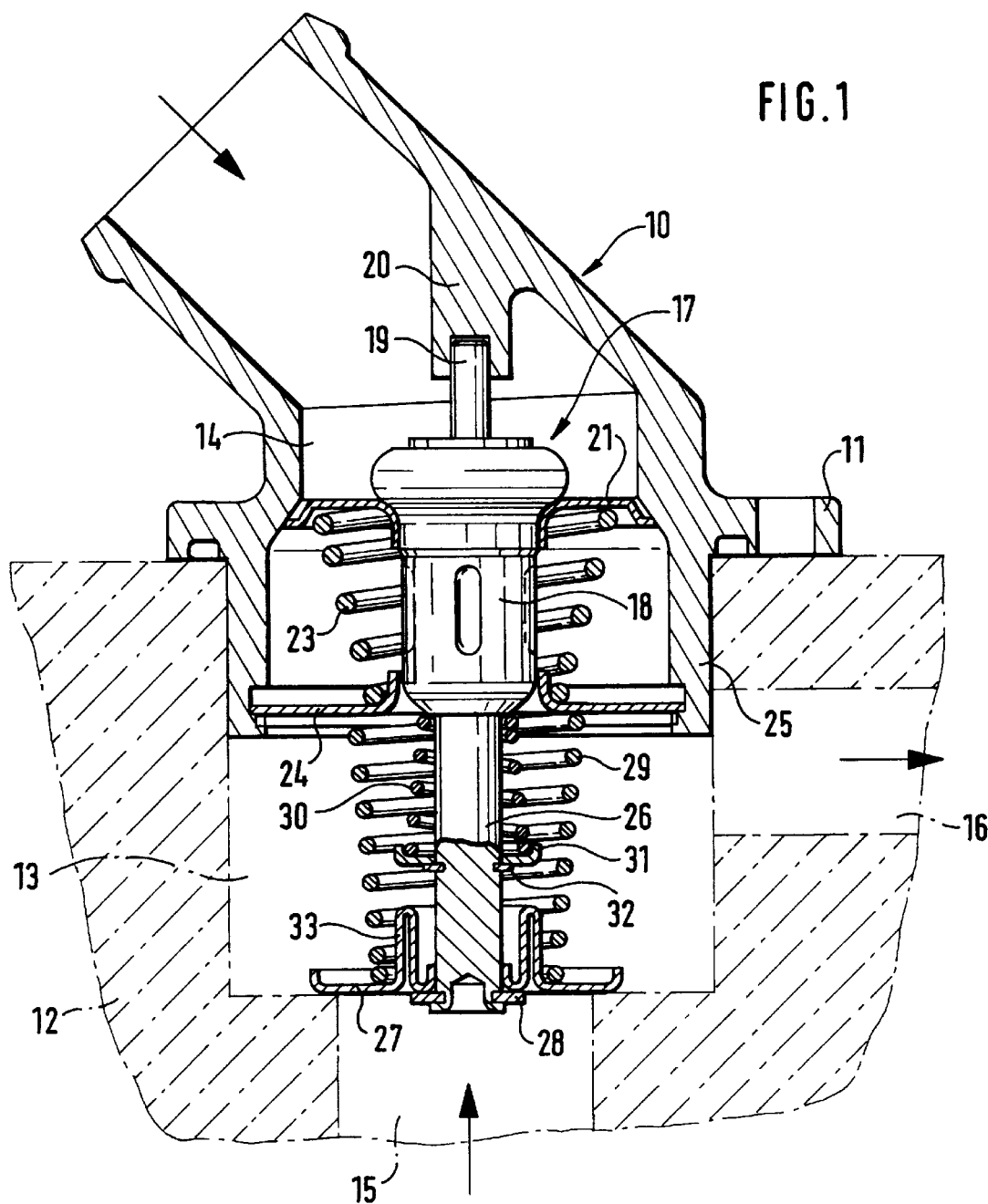
FIG. 1 is an elevational view partially in cross-section of a preferred thermostatic valve arrangement in accordance with the present invention.

The thermostatic valve arrangement represented in FIG. 1 includes a thermostatic valve insert 10 fastened to a coolant intake opening of a coolant pump housing 12 by conventional means such as with bolts extending through a flange 11 surrounding the intake opening. The coolant pump housing 12 defines a mixing chamber 13. A fluid passage 14 in the insert 10 is connected to the return line such as a hose of a coolant radiator (not shown) and opens into the mixing chamber 13. A fluid passage 15 for an engine outlet is formed in the pump housing 12 and also opens into the mixing chamber 13 opposite the fluid passage 14. Finally, a third fluid passage 16 is located in the pump housing 12 between the fluid passages 14,15 and leads to an engine coolant intake. In conventional manner, coolant from a radiator enters the mixing chamber 13 through fluid passage 14, coolant from the engine which bypasses the radiator enters the mixing chamber 13 through fluid passage 15, and coolant from the mixing chamber 13 is returned to the engine through fluid passage 16. The thermostatic valve arrangement of the present invention adjusts the amount of coolant which enters the mixing chamber through fluid passages 14,15 as described in detail below.

A preferred embodiment of the thermostatic valve arrangement of the present invention is shown disposed for operation within the mixing chamber 13 and includes a thermostatic assembly made up of: a thermostatic element housing 18 which is filled with a thermostatic element—preferably a conventional wax mixture—that changes its volume as a function of temperature; a piston 19 which extends from a first end of the housing 18 to and is supported by a shoulder 20 of the insert 10; and a shaft 26 which is secured to the opposite end of the housing 18 in fixed position relative thereto. The piston 19 is movable with respect to the housing 18 in response to changes in the volume of the thermostatic element resulting from changes in temperature which cause the housing 18 to move axially in the chamber, the shaft 26 moving with the housing 18.

The thermostatic valve arrangement also includes a main valve assembly made up of: a main valve disc 21 which is disposed axially about the thermostatic element housing 18 for slidable movement relative thereto and which, together with a valve seat of the insert 10 surrounding the fluid passage 14 for the radiator return, forms a fluid seal for closing coolant flow from the radiator to the mixing chamber 13; a main spring 23 which urges the main valve disc 21 towards the valve seat for closing coolant flow through fluid passage 14; and a spring support member comprising a cross arm 24 which extends between and is supported itself in a groove in extensions 25 of the insert 10 that extends into the mixing chamber 13. The main spring 23 extends between and is secured to the main valve disc 21 and the cross arm 24. Furthermore, the first end of the housing 18 includes a radially enlarged portion 17 which prevents the housing 18 from completely sliding through the opening in the main valve disc 21, and the cross arm 24 also includes an opening through which the housing 18 is slidably disposed. As will now be apparent, upward movement of the piston 19 due to an increase in temperature of the thermostatic element causes housing 18 to move downwardly, which subsequently causes main valve disc 21 engaged with enlarged portion 17 of housing 18 to move downwardly against main spring 23 thereby opening coolant flow through fluid passage 14 into the mixing chamber 13.

The components of the thermostatic valve arrangement described above are common to the thermostatic valve arrangement described in the aforementioned German patent document DE 195 45 08, which also includes a bypass valve assembly and a valve support assembly from which the present invention differs and is an improvement over.

The bypass valve assembly of the thermostatic valve arrangement of the present invention includes: a bypass valve disc 27 which is slidably disposed on and in direct fluid sealing contact with the shaft 26; a retaining ring 28 which is secured in fixed location to an end of the shaft 26 opposite the housing 18; and a bypass spring 29 which extends between and is connected to the bypass valve disc 27 and cross arm 24 and which urges the bypass valve disc 27 toward engagement with the coolant pump housing 12 for blocking the fluid passage 15 and closing coolant flow therethrough into the mixing chamber 13. The maximum movement of the bypass valve disc 27 away from the housing 18 is limited by the retaining ring 28 over which the bypass valve disc 27 cannot pass, and the bypass valve disc 27 includes a sleeve-like shoulder 33 which surrounds the shaft 26 at a radial spacing thereto and extends axially towards the housing 18.

A valve support assembly also is included in the thermostatic valve arrangement of FIG. 1 for supporting the bypass valve disc against further displacement after a predetermined displacement from its closed position. The valve support assembly includes: a stop element in the form of a locking ring 32 disposed on the shaft 26 at a fixed location thereon between the housing 18 and the retaining ring 28; an abutment member 31 slidably disposed on the shaft 26 between the housing 18 and the locking ring 32; and a third spring 30 which extends between and is connected to the abutment member 31 and the housing 18. The locking ring 32 prevents the abutment member 31 from sliding on the shaft 26 therepast and the third spring 30 urges the abutment member 31 towards engagement with the locking ring 32.

The sleeve-like shoulder 33 of the bypass valve disc 27 is dimensioned so that displacement of the bypass valve disc 27 toward the housing 18 eventually results in the shoulder 33 engaging abutment member 31 whereby the force of the third spring 30 is applied on bypass valve disc 27 against further displacement. The radial spacing defined by the sleeve-like shoulder 33 is also sufficient to allow locking ring 32 disposed on the shaft 26 to move therein.

With particular regard to the operation of the thermostatic valve arrangement of the present invention, the operating state of the thermostatic valve arrangement shown in FIG. 1 corresponds to an engine that is in the cold state running at idle. In this state, the piston 19 is retracted into the thermostatic element housing 18 so that the housing 18 is in the uppermost position whereat the main valve disc 21 is in the closed position blocking fluid flow through fluid passage 14, and the bypass valve disc 27 rests on the coolant pump housing 12 in the closed position blocking fluid flow through fluid passage 15 for the engine outlet and is maintained in this position by the first spring 29. Coolant therefore does not flow through the mixing chamber 13 when the engine is in the cold state and at idle and the warm-up period of the engine is thereby substantially shortened.

If the engine is put to work while still in the cold state, some coolant flow is desired but cooling of the coolant by the radiator should be avoided until the engine has warmed up. Coolant flow is achieved in such case by permitting coolant flow through the bypass valve assembly. In particular, a conventional coolant pump (not shown) is arranged in the customary way in the coolant circuit and is located downstream of the fluid passage 16 for the engine intake. The coolant pump runs as a function of the engine rpm whereby a differential pressure P is created between the fluid passage 15 for the engine outlet and the fluid passage 16 for the engine intake. The bypass spring 29 includes a spring characteristic whereby when a differential pressure $P_1$ is reached, the bypass valve disc 27 will lift off its engagement with the coolant pump housing 12 to partially open the bypass valve and permit fluid flow through fluid passage 15 into the mixing chamber 13 and then through fluid passage 16 to the engine intake. Furthermore, the bypass spring 29 is designed whereby when a second pressure differential $P_2$ is reached, the shoulder 33 of the bypass valve disc 27 will overcome the spring 29 and engage the abutment member 31 and prevent further displacement of the bypass valve disc 27 with respect to the thermostatic element housing 18.

Figure 3:
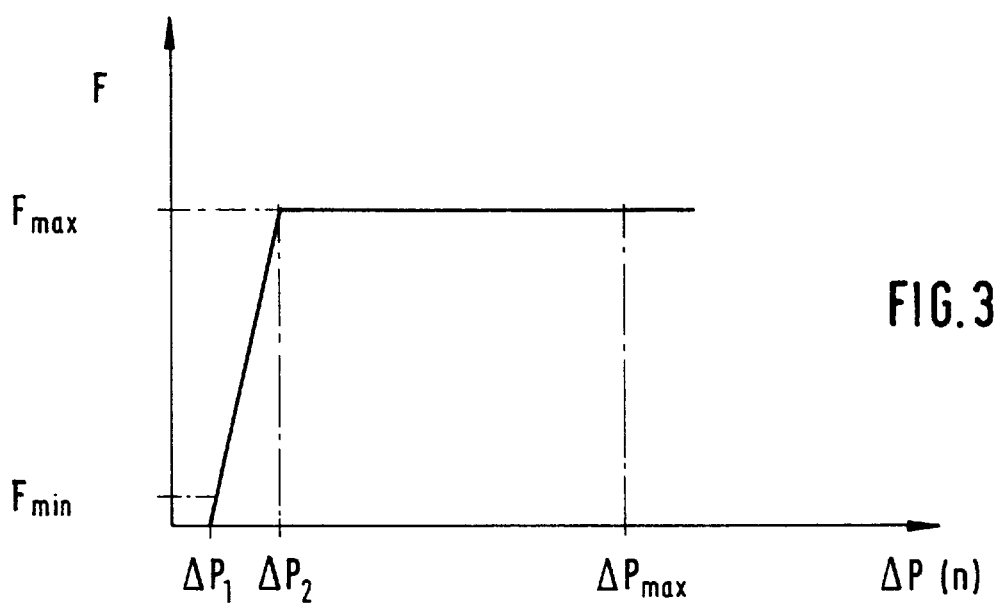
FIG. 3 is a graph illustrating the cross-sectional flow through the bypass valve assembly as a function of differential pressure when the engine is running in the cold state.
Figure 4:
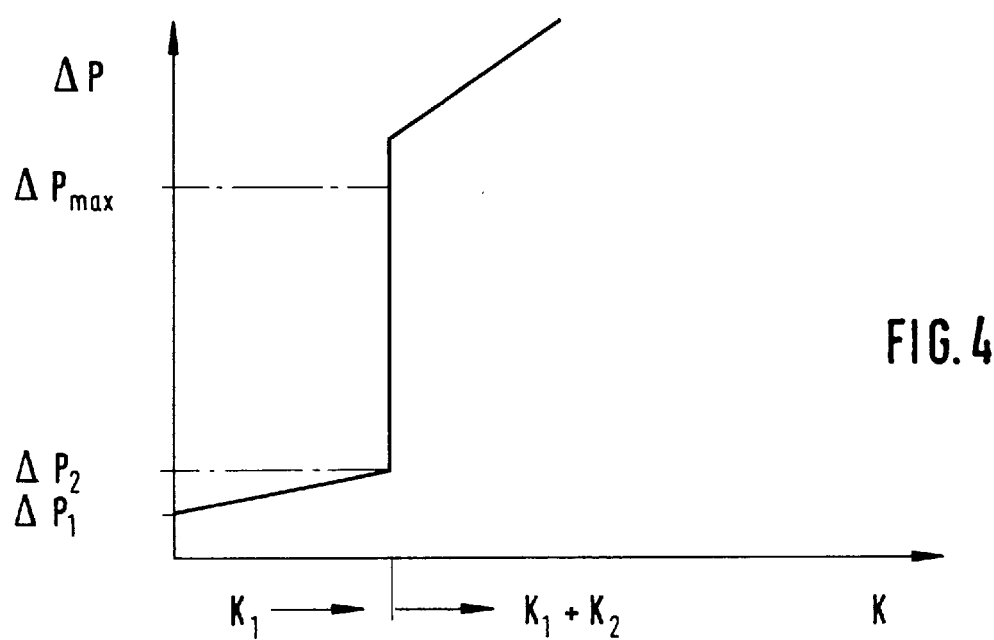
FIG. 4 is a graph illustrating the spring forces acting on the bypass valve disc in relation to the differential pressure.

Thus, as illustrated in FIG. 3, the maximum cross sectional flow $F_{max}$ through the bypass valve assembly is obtained when the differential pressure $P_2$ has been reached or exceeded and, as illustrated in FIG. 4, only the force $K_1$ of the bypass spring 29 acts on the bypass valve disc 27 against the force of the differential pressure P until the bypass valve disc 27 engages with its shoulder 33 against the abutment member 31 when the differential pressure reaches $P_2$, after which the force $K_1$ of the bypass spring 29 combines with the force $K_2$ of the third spring 30 and a force at least corresponding to the maximum differential pressure $P_{max}$ must be exerted to further displace the bypass valve disc 27 toward the housing 18. Thus, the abutment member 31 and third spring 30 support the bypass valve disc 27 against further movement towards the housing 18 up to at least pressure $P_{max}$. This is accomplished, for example, by the provision of the third spring having a sufficient spring characteristic and/or being sufficiently pre-stressed whereby the valve disc 27 will not be further displaced toward housing 18 even when an anticipated maximum differential pressure $P_{max}$ is reached between the fluid passage 15 and fluid passage 16.

Preferably, the differential pressure $P_2$ approximately corresponds to engine rpm of 1,000/min to 2,000/min and the differential pressure $P_1$ is slightly less than the differential pressure $P_2$ and greater than idle rpm of the engine. Under these parameters, the bypass valve disc 27 will remain closed and coolant flow will be blocked while the internal combustion engine runs at idle and will therefore heat up quickly and the engine warm-up period will be substantially shortened. However, if the engine is used and engine rpm corresponding to the differential pressure $P_1$ is reached while in the cold state, then some coolant flow will nevertheless be provided to prevent any localized overheating, with a maximum coolant flow occurring if the differential pressure $P_2$ is reached or exceeded.

When the opening temperature of the thermostatic element is reached the thermostatic element will begin to increase in volume and the piston 19 supported on the shoulder 20 of the insert 10 will begin to extend out of the housing 18 and thereby displace the housing 18 with the main valve disc 21 and begin to open coolant flow from the radiator return into the mixing chamber 13 through fluid passage 14. In most cases the differential pressure P at that point will lie above the differential pressure $P_2$, whereby the bypass valve disc 27 will be in an open position resting against the abutment element 31 for fluid flow through fluid passage 15 and the thermostatic valve will operate in the conventional manner for keeping the coolant temperature constant, wherein the cross-sectional flow through the main valve assembly and the cross-sectional flow through the bypass valve assembly will be inversely adjusted.

Figure 2:
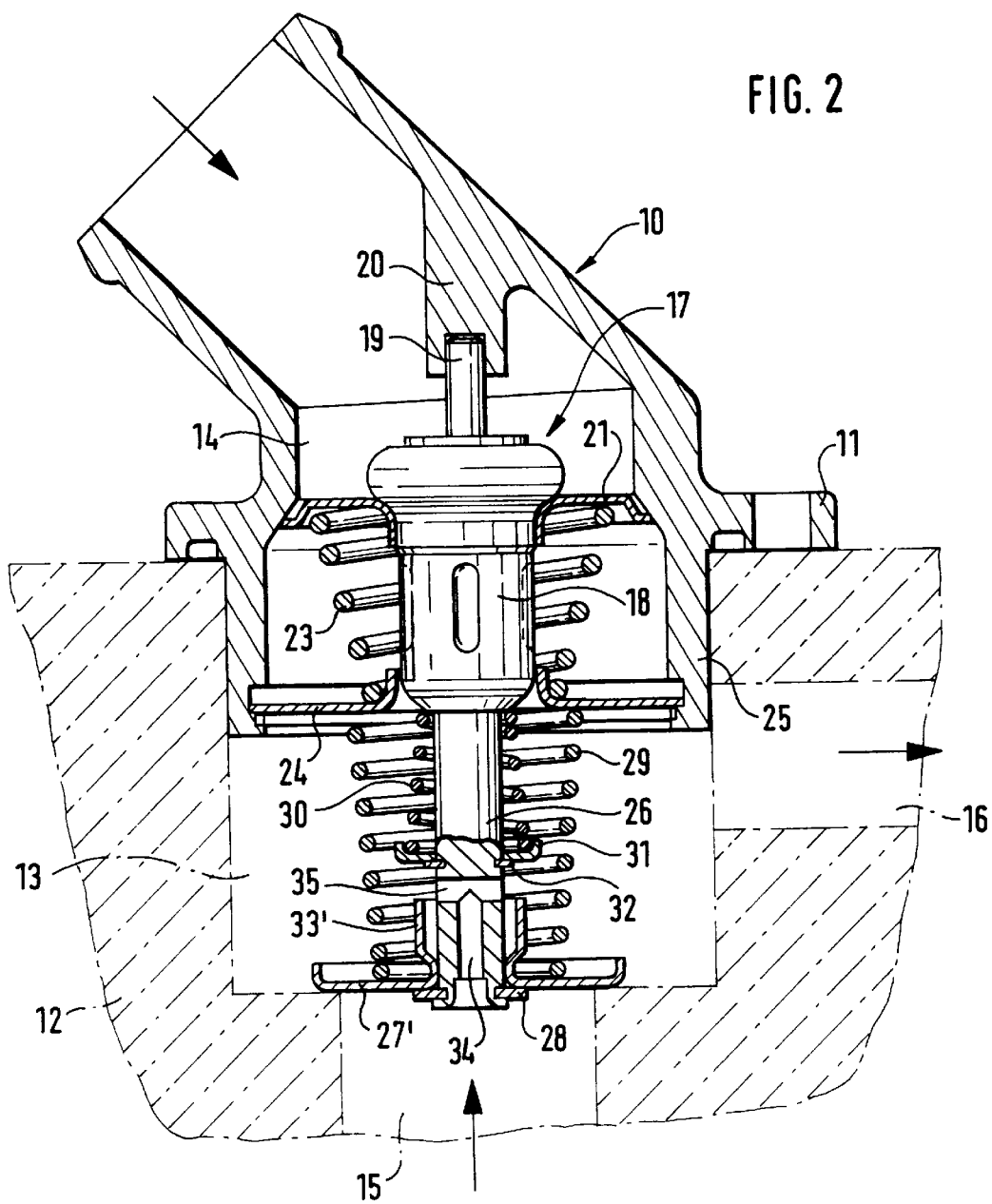
FIG. 2 is an elevational view partially in cross-section of another preferred thermostatic valve arrangement in accordance with the present invention.

While no coolant flow is provided for when the engine is in the cold state and a differential pressure of $P_1$ has not been reached, it nevertheless may be desirable to provide some minimal coolant flow $F_{min}$ through the engine to prevent any localized overheating and, consequently, a thermostatic valve arrangement of the present invention which provides a minimum flow of coolant is shown in FIG. 2. The thermostatic valve arrangement of FIG. 2 is identical to that of FIG. 1, except for the following differences, and corresponding elements are thus identically numbered.

Unlike the thermostatic valve arrangement of FIG. 1, the thermostatic valve arrangement of FIG. 2 includes a shaft 26 in which an axial bore 34 is formed in its end facing the fluid passage 15 for the engine outlet, and in which a transverse bore 35 located in front of the spring abutment 31 is formed. The bores 34,35 provide a minimum cross-sectional flow, preferably of 8 mm², when the bypass valve disc 27' is held in the closed position on the fluid passage 15 by the bypass spring 29. Furthermore, the bypass valve disc 27' has a sleeve-like shoulder 33' configured as a bell-shaped section which is extendable over the locking ring 32 and, when the bypass valve disc 27' is in the fully open position, the shoulder 33' rests against the abutment member 31 in fluid sealing relation therewith whereby fluid flow from the bores 34,35 is prevented from flowing into the mixing chamber by the engagement of the shoulder 33' against the abutment member 31. Furthermore, as consequential and beneficial result of this design, when the shoulder 33' rests against the spring abutment 31 and the main valve assembly is completely opened with the bypass valve assembly completely closed, which condition occurs during maximum cooling of the engine, no bypass flow occurs from the fluid passage 15 to the mixing chamber 13 and the coolant flow to the engine comes solely through the radiator return for the lowest temperature coolant possible.

It will therefore be readily understood by those persons skilled in the art that the present invention is susceptible of a broad utility and application. Many embodiments and adaptations of the present invention other than those herein described will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention, the present invention being limited only by the claims appended hereto and equivalents thereof.

Thus, whereas the invention has been explained by means of the example of a thermostatic valve arrangement having a thermostatic element heated by the temperature of the coolant, the present invention is also suitable for use with a thermostatic valve arrangement having a heating device which can be supplied with electric energy, whereby different temperature ranges can be present in accordance with the cooling requirements of the internal combustion engine. For example, the present invention is suitable for the thermostatic valve arrangement disclosed in German Patent Publication DE 44 09 547 A1.

What is claimed is:

1. A thermostatic valve arrangement, comprising:

a thermostatic assembly including a thermostatic element housing containing a thermostatic element which increases in volume with increases in temperature and which decreases in volume with decreases in temperature, a piston extending from a first end of said housing in a first direction along an axis and movable relative to said housing in response to volume changes in the thermostatic element, and a shaft extending along the axis in a second direction opposite to the first direction from and fixed relative to a second end of said housing;

a spring support member extending from said housing generally perpendicular to the axis and including an opening through which said housing is slidably disposed;

a main valve assembly including a main valve member disposed axially about said housing for slidable movement relative thereto, said first end of said housing having a radially enlarged portion for preventing said first end of said housing from sliding through said opening in said main valve member, and a main spring element extending between and connected to said main valve member and said spring support member for urging said main valve member away from said spring support member toward engagement with said enlarged portion of said first end of said housing;

a bypass valve assembly including a retaining member secured to said shaft at a fixed location thereon, a bypass valve member disposed axially about said shaft for slidable movement relative thereto and disposed between said retaining member and said housing, and a bypass spring element disposed between and connected to said bypass valve member and said spring support member, said retaining member preventing sliding movement of said bypass valve member therepast and said bypass spring element urging said bypass valve member away from said spring support member toward engagement with said retaining member; and a valve support assembly including a stop element disposed on said shaft at a fixed location thereon between said housing and said retaining member, an abutment member slidably disposed on said shaft between said housing and said stop member, and a third spring element disposed between and connected to said abutment member and said housing, said stop member preventing sliding movement of said abutment member therepast and said third spring element urging said abutment member away from said housing toward engagement with said stop member.

2. A thermostatic valve arrangement according to claim 1, wherein said bypass valve member is slidably disposed in direct contact with said shaft.

3. A thermostatic valve arrangement according to claim 1, wherein said bypass valve member includes a sleeve-like shoulder that surrounds said shaft at a radial spacing therefrom and that extends towards said abutment member for engagement therewith when said bypass valve member and said housing move towards one another.

4. A thermostatic valve arrangement according to claim 3, wherein said radial spacing of said sleeve-like shoulder is dimensioned to permit said stop element on said shaft to move therein when said housing and said bypass valve member move towards one another.

5. A thermostatic valve arrangement according to claim 1, wherein said shaft includes an elongate opening extending along the axis towards said housing from an end of said shaft opposite said housing, and said shaft also includes a side opening disposed between said stop element and said retaining member and communicating with said elongate opening.

6. A thermostatic valve arrangement according to claim 5, wherein said side opening is disposed adjacent said stop element.

7. A thermostatic valve arrangement according to claim 5, wherein said bypass valve member includes a sleeve-like shoulder that surrounds said shaft at a radial spacing therefrom and that extends towards said abutment member for engagement therewith when said bypass valve member and said housing move towards one another.

8. A thermostatic valve arrangement according to claim 7, wherein said bypass valve member is slidably disposed in direct contact with said shaft and forms a fluid seal therewith.

9. A thermostatic valve arrangement according to claim 7, wherein said sleeve-like shoulder forms a fluid seal with said abutment member when engaged therewith.

\* \* \* \* \*